US008616242B2

(12) United States Patent
Buseyne et al.

(10) Patent No.: US 8,616,242 B2
(45) Date of Patent: Dec. 31, 2013

(54) PIPE OF CIRCULAR OVERALL CROSS SECTION, FITTED WITH AN AIRFLOW RATE REGULATING DEVICE

(75) Inventors: Serge Buseyne, Toulouse (FR); Camille Lefebvre, Saint Sulpice (FR)

(73) Assignee: Aldes Aeraulique (FR)

( * ) Notice: Subject to any disclaimer, the term of this patent is extended or adjusted under 35 U.S.C. 154(b) by 177 days.

(21) Appl. No.: 13/383,337

(22) PCT Filed: Jul. 7, 2010

(86) PCT No.: PCT/FR2010/051428
§ 371 (c)(1),
(2), (4) Date: Jan. 10, 2012

(87) PCT Pub. No.: WO2011/004118
PCT Pub. Date: Jan. 13, 2011

(65) Prior Publication Data
US 2012/0103453 A1 May 3, 2012

(30) Foreign Application Priority Data

Jul. 10, 2009 (FR) ..................................... 09 54827

(51) Int. Cl.
*F15D 1/04* (2006.01)
*F16K 1/22* (2006.01)
(52) U.S. Cl.
USPC .......... 138/46; 138/37; 137/625.31; 251/305; 454/323; 366/338
(58) Field of Classification Search
USPC ............. 138/37, 39, 46; 137/625.31; 251/305; 366/337, 338; 454/323
See application file for complete search history.

(56) References Cited

U.S. PATENT DOCUMENTS

| 3,238,955 | A | * | 3/1966 | Lassiter, Jr. ........................ 137/1 |
| 4,100,938 | A | * | 7/1978 | Dravnieks et al. ........ 137/625.31 |
| 4,691,894 | A | * | 9/1987 | Pyotsia et al. ................. 251/127 |
| 5,398,728 | A | * | 3/1995 | Baumeister et al. ............ 138/37 |
| 5,465,756 | A | | 11/1995 | Royalty et al. |
| 7,168,682 | B2 | * | 1/2007 | Nanba et al. ................... 251/305 |
| 2007/0218830 | A1 | | 9/2007 | Baik |

FOREIGN PATENT DOCUMENTS

| DE | 3226453 A1 | * | 1/1984 |
| DE | 102007019231 B3 | | 7/2008 |
| FR | 2477665 A | | 9/1981 |
| FR | 2495798 A | | 6/1982 |

OTHER PUBLICATIONS

International Search Report issued Oct. 19, 2010 by European Patent Office re: PCT/FR2010/051428, citing: DE 10 2007 019231 B3, US 2007/218830 A1, US 5,465,756 A, FR 2 495 798 A and FR 2 477 665 A.

* cited by examiner

*Primary Examiner* — Patrick F Brinson
(74) *Attorney, Agent, or Firm* — Cantor Colburn LLP

(57) ABSTRACT

The invention relates to a system and to a method for controlling an aircraft engine starter-generator. The system comprises a transmission box (20) with a fixed gear ratio intended to be mechanically coupled to a turbine shaft (12) of the engine to allow the latter to be started, a gearbox (40) with multiple gear ratios that is mechanically coupled to a pinion of the transmission box, a starter-generator (30) mechanically coupled to a pinion of the gearbox, and means for instigating a change in gear ratio of the gearbox according to the mode of operation of the starter-generator.

10 Claims, 16 Drawing Sheets

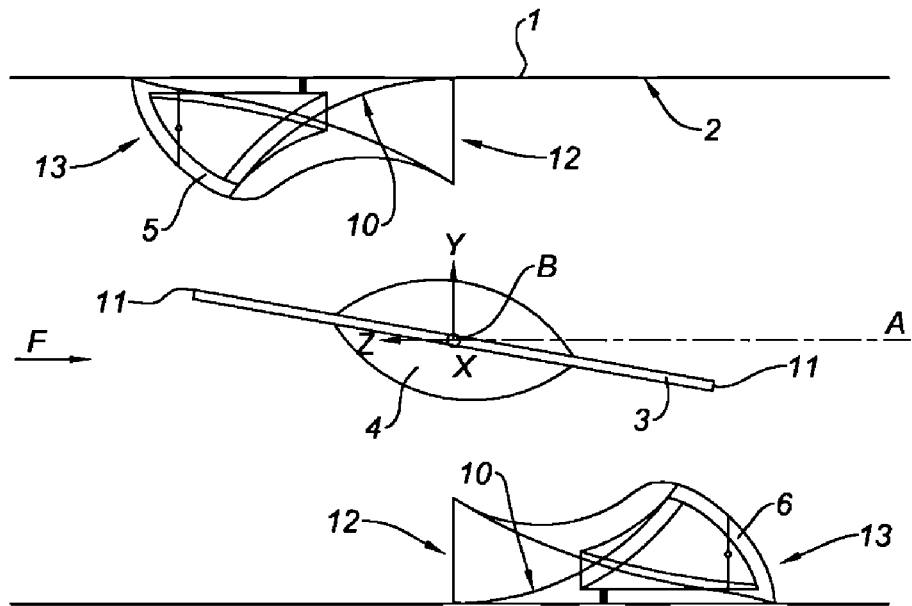
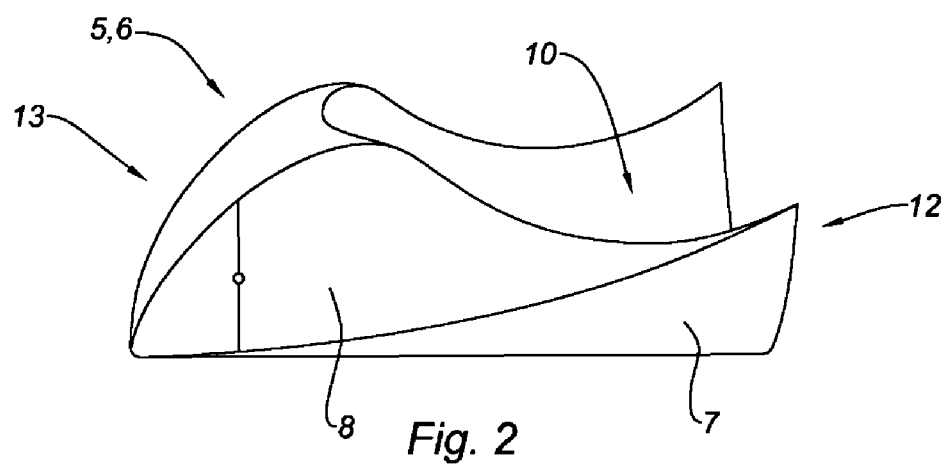

PIPE OF CIRCULAR OVERALL CROSS SECTION, FITTED WITH AN AIRFLOW RATE REGULATING DEVICE

TECHNICAL FIELD

The invention more particularly relates to the technical field of controlled mechanical ventilation (CMV) installations Pipe of circular overall cross section, fitted with an airflow rate regulating device.

BRIEF SUMMARY

The ventilation of homes and ground locations, such as schools and offices, makes it possible to improve the preservation of the building, and to evacuate specific pollution related to the occupants' presence, the building itself, or the materials or machines used on the premises.

It is necessary to master this ventilation in order to limit heat losses related to this renewal of the air.

To that end, it is known to install dampers in the ventilation system. A damper is a member inserted into an air duct or used jointly with an air terminal device, making it possible to modify the systems' resistance and, therefore, adjust the airflow.

Since flow rate instructions are generally given, the aim of the damper is to keep the ventilation flow substantially constant and equal to the instructions.

To that end, in the case of a fixed rate installation, it is known to use an iris damper as well as a differential pressure tap. The position of the damper is calculated according to the differential pressure, this position then being frozen. An additional motorized damper may be used, if necessary to cover the system.

Another solution consists of using a regulation module able to be motorized and making it possible to ensure a fixed flow rate over a wide pressure range.

In the case of a variable air volume installation, it is known to use a V.A.V. (Variable Air Volume) system, made up of a motorized damper and a flow measurement cross. Its application is more or less reserved for land facilities, in light of the cost and the flow rates used. The motorized damper makes it possible to regulate a flow rate chosen and measured by the cross. The operation of the damper is nevertheless impossible for low flows, due to the measurement imprecision of the cross.

It is also known to use a blade damper, making it possible to regulate the air flow according to the angle of the blade.

This type of damper has the following drawback.

In the event one wishes to obtain a constant flow rate with a low value, the angle of the blade must vary by very small amounts to maintain the flow rate. In fact, the angle of the blade must vary only by several degrees in order to keep the flow rate constant over the entire pressure range.

FIG. 17 is a diagram showing the degree of opening of a blade damper, i.e. the incline angle of the blade relative to the plane perpendicular to the axis of the pipe, over a pressure range varying from 20 to 150 Pa, the flow rate being kept constant at a value of 10 m³ per hour.

As illustrated in this figure, in the event the pressure in the pipe is approximately 20 Pa, the angle of the blade must be approximately 5° and, in the event the pressure in the pipe is approximately 150 Pa, the angle of the blade must be approximately 13°.

The small angular variations of the blade do not make it possible to precisely maintain a constant flow rate in the pipe.

Furthermore, the pressure measurement is often difficult to perform because it is disrupted by the presence of the damper.

The invention aims to resolve these drawbacks by proposing a pipe with a circular overall cross section, fitted with an airflow rate regulating device, making it possible to precisely maintain a low and constant airflow rate in the pipe.

To that end, the invention relates to a pipe of circular overall cross section, fitted with an airflow rate regulating device comprising a circular flap with a diameter substantially corresponding to the inner diameter of the pipe, pivotably mounted around an axis substantially perpendicular to the axis of the pipe, and intended to be actuated via a motor, characterized in that the airflow rate regulating device includes at least one regulating member including an outer wall having a middle zone of cylindrical overall shape bearing against the inner wall of the pipe, on either side of which first and second zones are positioned withdrawn from said inner wall of the pipe, so as to respectively form first and second lateral airflow channels, the regulating member also having an inner wall with a hollow zone designed so that, when the flap pivots, the edge of the flap is flush with or positioned near the corresponding inner wall.

In this way, the passage of air between the edge of the flap and the inner wall of the pipe is reduced, and occurs primarily at the first and second lateral channels forming passages, formed between each regulating member and the flap. The passage section for the air is thus considerably reduced, so that a small incline of the flap only opens a small passage section for the air. Thus, to obtain a same passage section, it is necessary to tilt the flap more significantly in the case of the invention than in the case of the blade of the prior art.

The shape of the first and second withdrawn zones, and therefore of the passage sections for the air at the lateral channels, can be adjusted as a function of the operating pressure range to which the pipe is subject.

According to one possibility of the invention, the airflow rate regulating device includes first and second regulating members, arranged opposing one another and generally symmetrically relative to the swivel axis of the flap.

According to one feature of the invention, each regulating member has, in top view, a generally triangular or trapezoidal shape, having a wide end facing the axis of rotation side of the flap and a narrower end, facing the opposite side.

According to a first embodiment of the invention, the inner wall has, in the hollow zone, the shape of a sphere portion whereof the diameter substantially corresponds to the diameter of the flap.

In that case, no air passage is possible between the edge of the flap and the hollow zones of the regulating members. The air passages therefore only occur laterally, at the lateral channels.

According to a second embodiment of the invention, the inner wall has, in the hollow zone, the shape of a sphere portion whereof the diameter is larger than the diameter of the flap, the flap being mobile between a first position in which it extends substantially perpendicularly to the axis of the pipe and in which the edge of the flap is flush with the inner wall, and at least one second position in which the edge of the flap is further away from the inner wall.

In this way, when the flap is in the first position, no passage of air is possible between the edge of the flap and the hollow zone. The air passage section between the edge of the flap and the hollow zone then increases as the flap tilts.

Preferably, each regulating member includes a hollow inner space as well as at least one orifice connecting the inside of the pipe to the hollow space.

According to one feature of the invention, each hollow space is fitted with pressure measuring means.

Measuring the pressure in the hollow space makes it possible to ensure that the measurement is not disrupted by the dynamic pressure effects and that the result obtained is reliable and precise.

Advantageously, the motor actuating the pivoting of the flap is housed, at least partially, in the flap, at the axis thereof.

Such a structure makes it possible to limit the bulk of the damper and ensure that the flap is rotated effectively.

According to one possibility of the invention, the position of the flap is calculated according to pressure measurements obtained by the measuring means.

Preferably, the first and second withdrawn zones of each regulating member are formed by planar zones.

BRIEF DESCRIPTION OF THE DRAWINGS

In any case, the invention will be well understood using the following description in reference to the appended diagrammatic drawing showing, as non-limiting examples, two embodiments of this pipe.

FIG. 1 is a longitudinal and transparent cross-sectional view of the pipe;

FIG. 2 is a perspective view of a regulating member;

DETAILED DESCRIPTION

Figure 3:
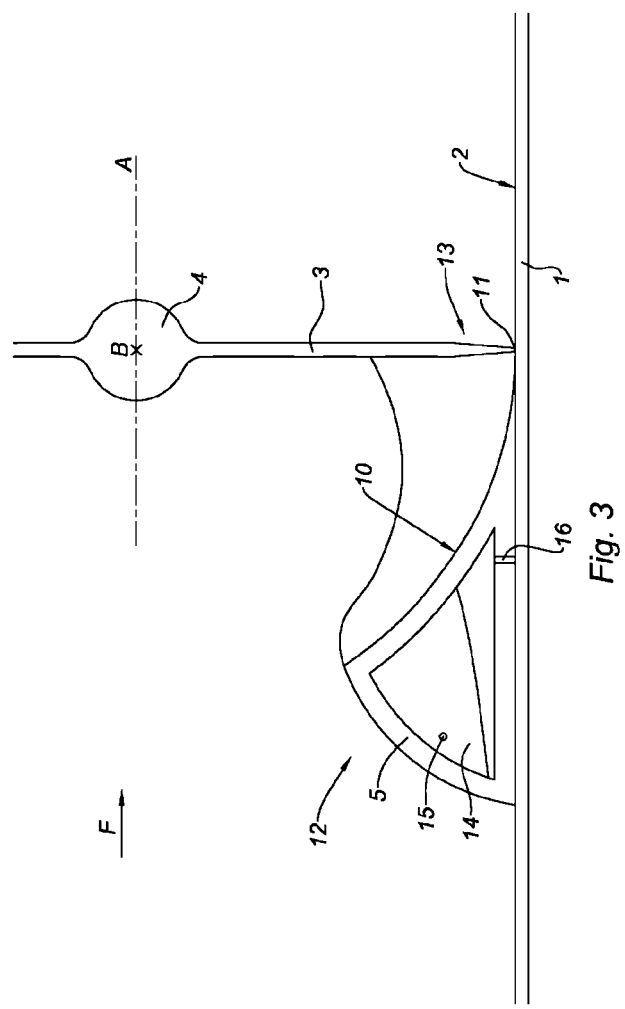
FIG. 3 is a longitudinal cross-sectional view, of part of the pipe, in the covering position of the flap.
Figure 4:
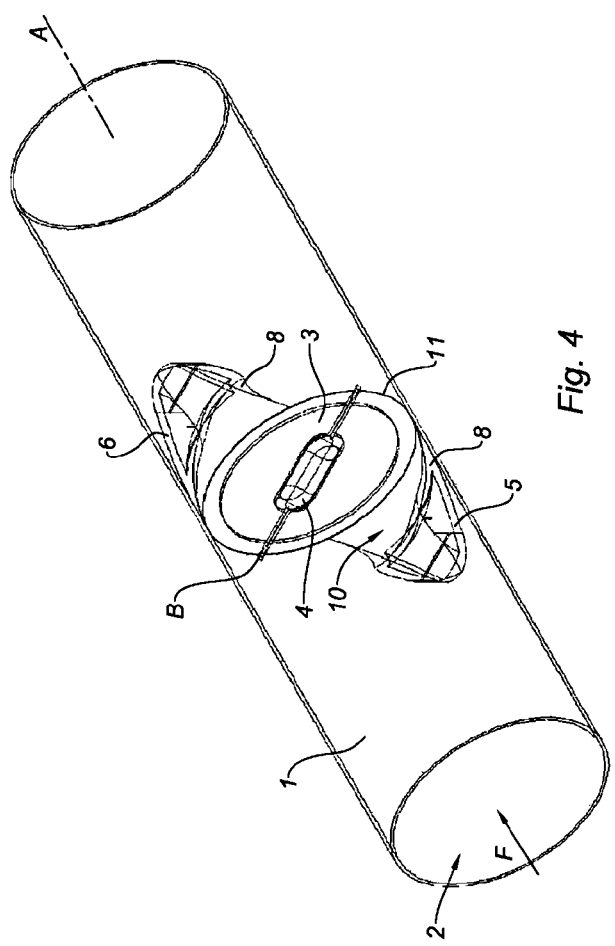
FIG. 4 is a transparent perspective view of the pipe, in the covering position of the flap.
Figure 5:
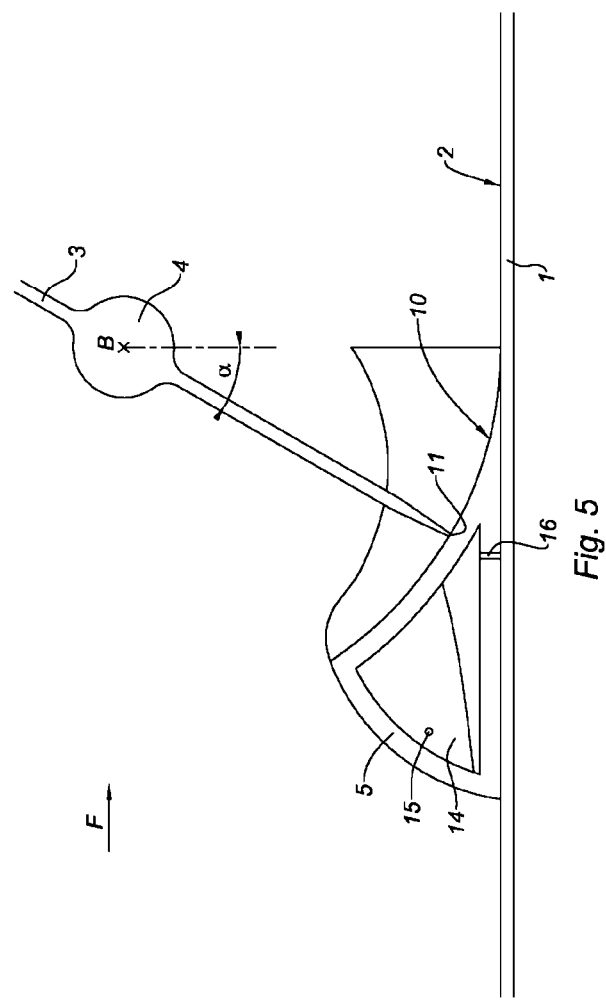
FIG. 5 is a view corresponding to FIG. 3, in an intermediate position of the flap.
Figure 6:
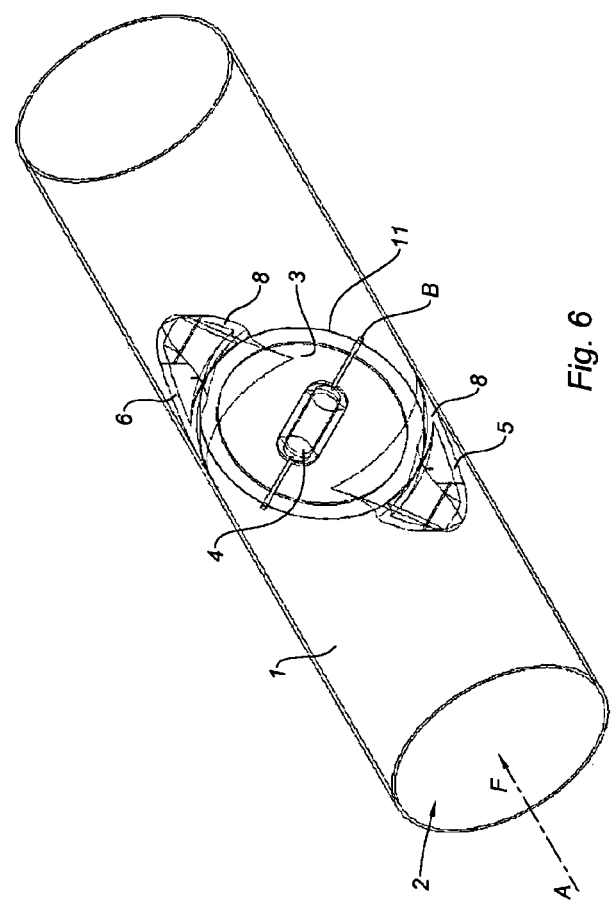
FIG. 6 is a view corresponding to FIG. 4, in the intermediate position of the flap.

FIG. 1 illustrates a pipe 1 according to the invention having an inner wall 2 and an outer wall of cylindrical cross section.

It includes an airflow rate regulating device comprising a circular flap 3 with a diameter substantially corresponding to the inner diameter of the pipe 1, pivotably mounted around an axis B substantially perpendicular to the axis A of the pipe 1, and actuated via a motor (not shown).

The flap 3 includes a central hollow zone 4, i.e. centered on the axis B of rotation of the flap 3, in which the motor is housed.

The airflow rate regulating device also includes first and second regulating members 5, 6, arranged opposing one another and generally symmetrically relative to the pivot axis B of the flap 3.

Figure 7:
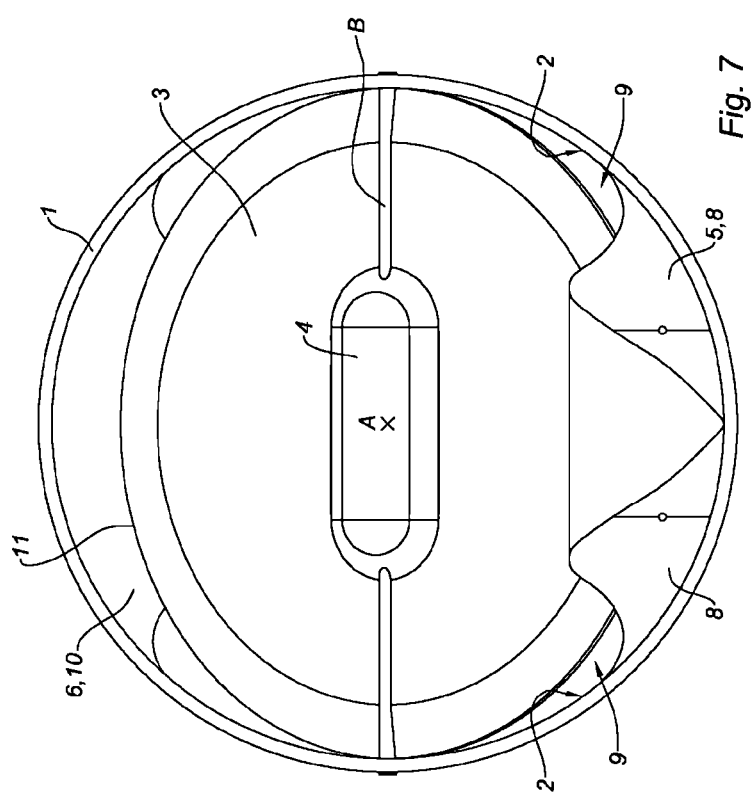
FIG. 7 is a view illustrating the section of the pipe, the flap being in the intermediate position.
Figure 8:
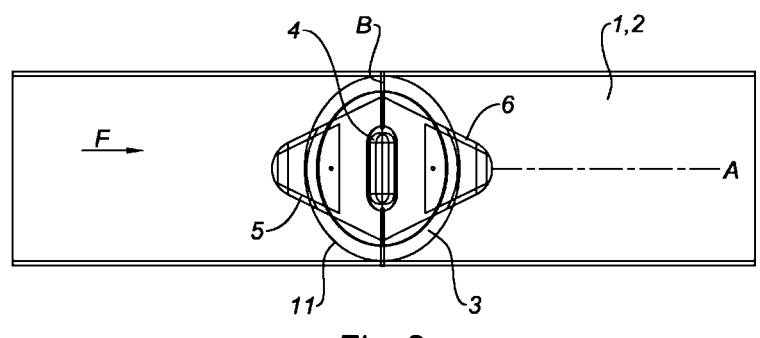
FIG. 8 is a transparent top view of the pipe, in the intermediate position of the flap.
Figure 9:
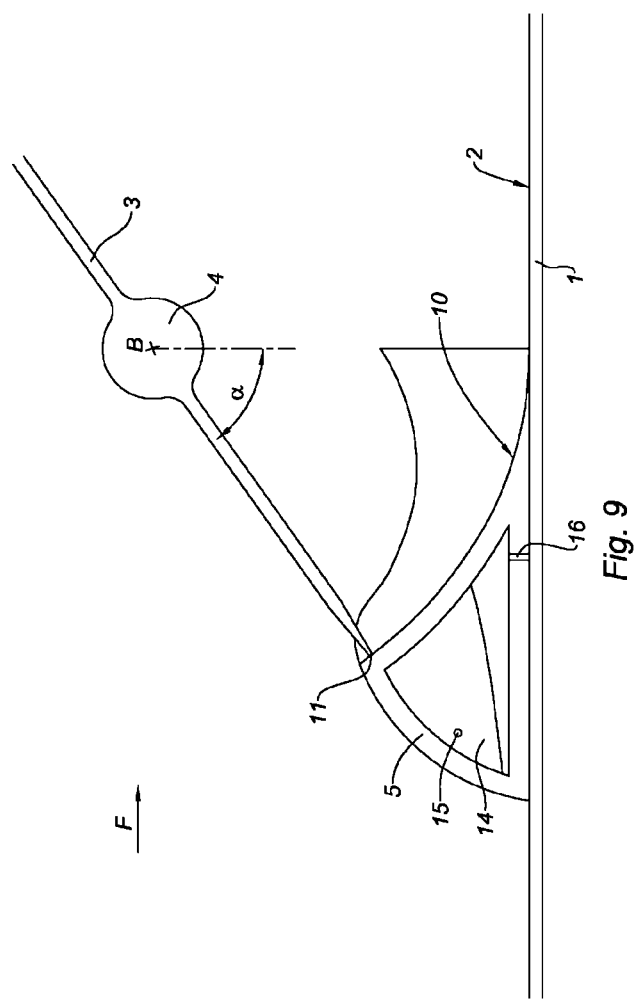
FIG. 9 is a view corresponding to FIGS. 3 and 5, illustrating another intermediate position of the flap, in which the latter is more inclined than in FIG. 5.

Each regulating member 5, 6 includes an outer wall having a middle zone 7 of generally cylindrical shape bearing against the inner wall 2 of the pipe 1, on either side of which first and second withdrawn zones 8 of said inner wall 2 are positioned, so as to form, depending on the position of the flap 3, first and second lateral airflow channels 9 (FIGS. 7 and 9). Each withdrawn zone 8 is formed by a planar zone.

Each regulating member 5, 6 also includes an inner wall 10 assuming the shape of a sphere portion whereof the diameter corresponds substantially to the diameter of the flap 3 and forming a hollow zone. The hollow zone 10 is thus designed so that, during pivoting of the flap 3, the edge 11 of the flap 3 is flush with the corresponding inner wall 10.

Each regulating member 5, 6 has, in top view, a generally triangular or trapezoidal shape, having a wide end 12 facing the axis B of rotation side of the flap 3 and a narrower end 13, facing the opposite side (FIGS. 1 to 3).

Each regulating member 5, 6 also includes a hollow inner space 14 as well as one or more orifices 15 connecting the inside of the pipe 1 to the hollow space 14. Each hollow space 14 is fitted with a pressure sensor 16.

The direction of travel of the air in the pipe is illustrated by arrow F in FIG. 1. The sensor 16 of the first regulating member 5 thus makes it possible to measure the so-called static pressure upstream of the flap 3, the sensor 16 of the second regulating member 6 making it possible to measure the static pressure downstream of the flap 3.

The regulating device is also fitted with instructing means allowing an operator or an automated system to adjust the desired airflow rate during operation of the mechanical ventilation installation.

The regulating device also includes regulating means designed to calculate the angular position a of the flap 3 to be obtained according to the instructions imposed and the pressure measurements obtained.

The operation of the invention is as follows.

When it is necessary to cover the pipe, the flap 3 is placed in its position shown in FIG. 3. In that position, the flap 3 extends perpendicular to the axis A of the pipe 1.

The position and shape of the withdrawn lateral zones 8 are adapted so that, in that position, the entire pipe 1 is covered by the flap.

During operation, the aim of the regulating device is to adapt the position of the flap 3 so as to obtain a constant airflow rate, irrespective of the pressure in the pipe.

Figure 18:
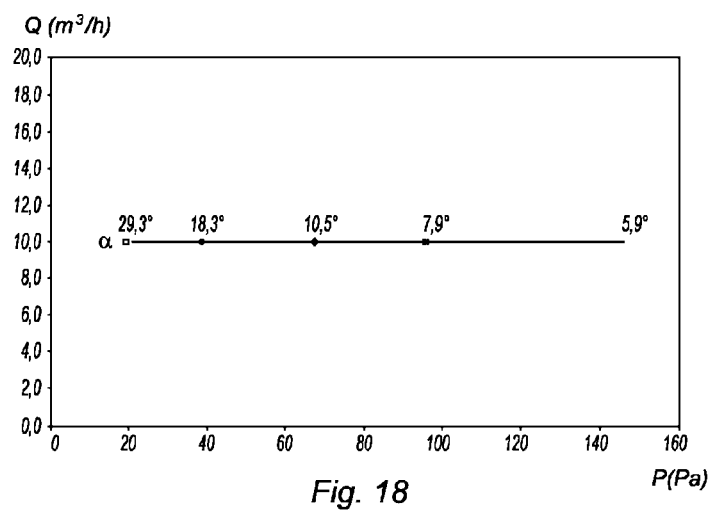
FIG. 18 is a diagram corresponding to that of FIG. 17, illustrating the degree of opening of the flap equipping the pipe according to the invention according to the pressure in the pipe.

The diagram of FIG. 18 illustrates the case where the instruction is to maintain a constant rate of 10 $m^3$ per hour.

To that end, in the case of significant pressure, in the vicinity of 150 Pa, the degree of opening of the flap 3 must be small, approximately 6°. It will be recalled that the degree of opening is the incline angle a of the flap 3 relative to the surface perpendicular to the axis A of the pipe 1.

Furthermore, in the case where the pressure is approximately 70 Pa, the degree of opening of the flap must be larger, approximately 11°.

This position of the flap is illustrated in FIGS. 5 to 8. In those figures, the incline of the flap 3 has been deliberately exaggerated so as to facilitate understanding.

In this position, the passage of the air cannot occur between the edge 11 of the flap 3 and the hollow zone 10. The passage of the air occurs only at the lateral channels 9 and, in part, laterally between the edge of the flap 11 and the inner wall 2 of the pipe 1. In that position, the passage section of the air at the lateral channels 9 formed by the withdrawn zones 8 is small.

When the pressure inside the pipe 1 is even lower, approximately 20 Pa, the degree of opening of the flap 3 must be greater, approximately 29°.

Figure 10:
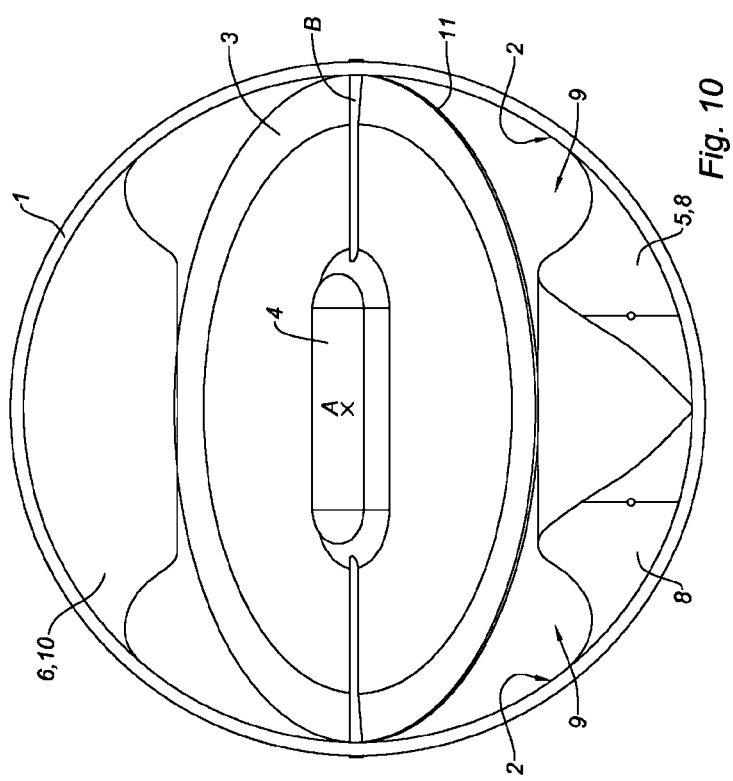
FIGS. 10 and 11 are views respectively corresponding to FIGS. 7 and 8, the flap being in the position of FIG. 9.
Figure 11:
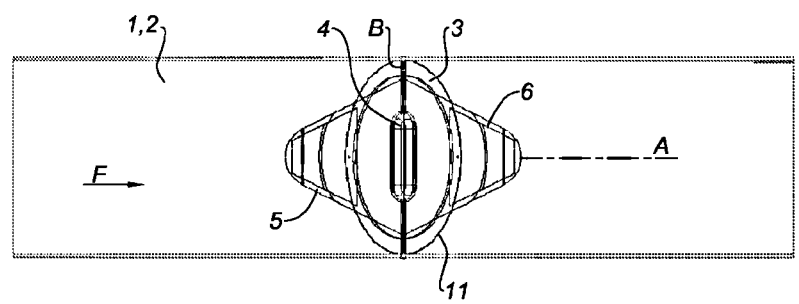

This position of the flap 3 is illustrated in FIGS. 9 to 11. As before, the incline of the flap 3 has been deliberately exaggerated in these figures so as to facilitate understanding.

As before, in this position, the passage of the air cannot occur between the edge 11 of the flap 3 and the hollow zone 10. The passage of the air occurs only at the lateral channels 9 and, in part, between the edge 11 of the flap 3 and the inner wall 2 of the pipe 1. In this position, the passage section of the air at the lateral channels 9 formed by the withdrawn zones 8 is larger than before.

When the pressure in the pipe 1 drops more, it is then necessary to produce a large passage section for the air. To that end, the degree of opening of the flap 3 is increased again.

Figure 12:
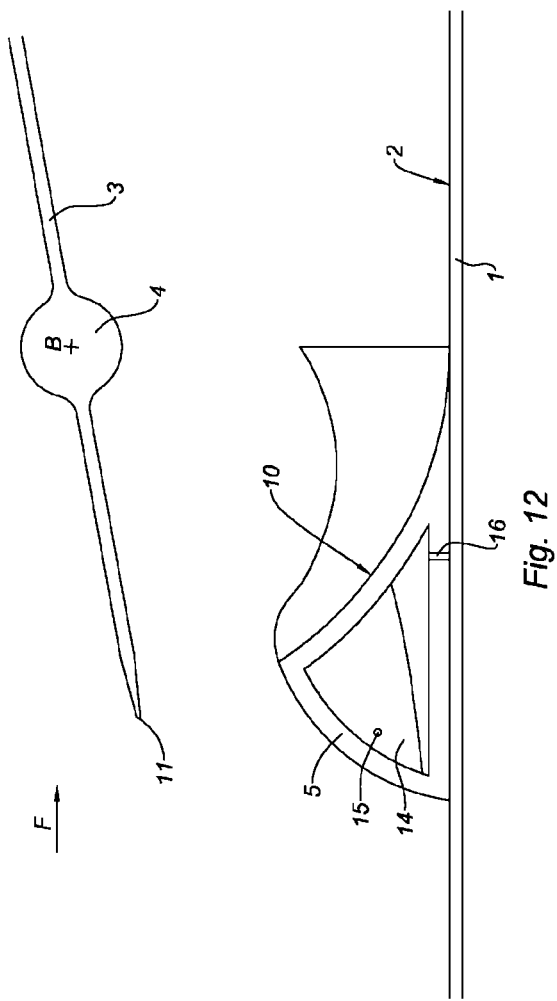
FIG. 12 is a view corresponding to FIGS. 3, 5 and 9, with the flap in the open position.
Figure 13:
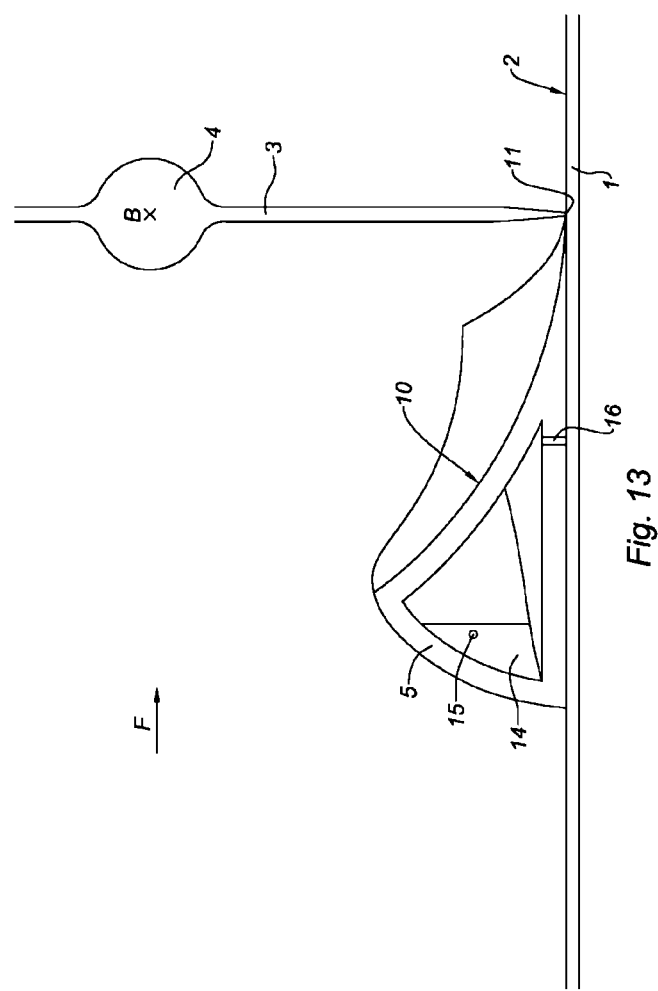
FIGS. 13, 14, 15 and 16 are views respectively corresponding to FIGS. 3, 5, 9 and 12, illustrating one alternative embodiment of the invention.

The edge of the flap 11 then exceeds the hollow zone 10, as illustrated in FIG. 12, which abruptly increases the passage section for the air.

FIGS. 13 to 16 illustrate an alternative embodiment of the invention in which the inner wall 10 has, in the hollow zone, the shape of a sphere portion whereof the diameter is larger than the diameter of the flap 3.

Figure 14:
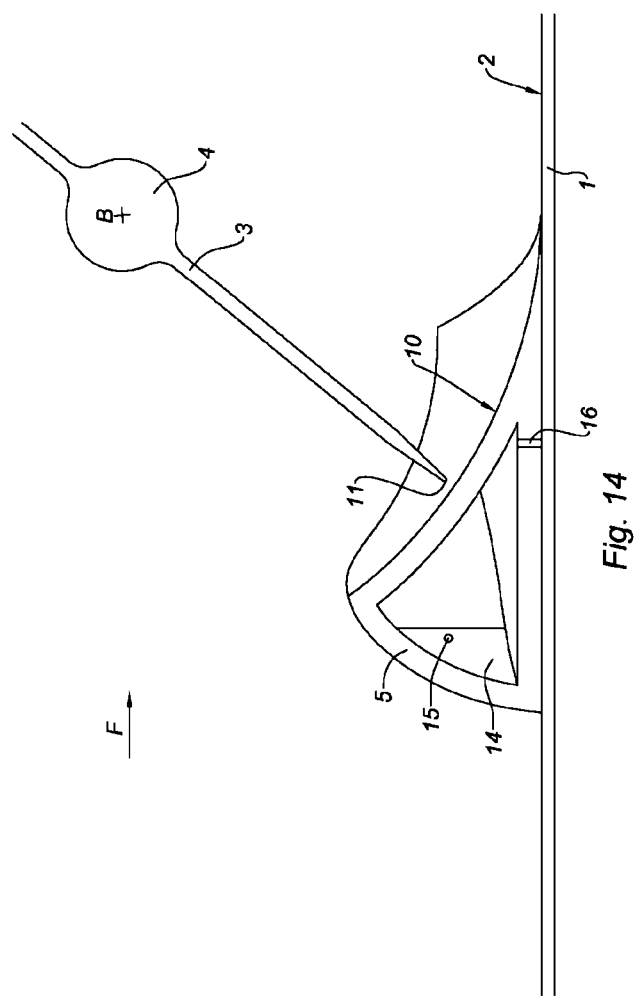
Figure 15:
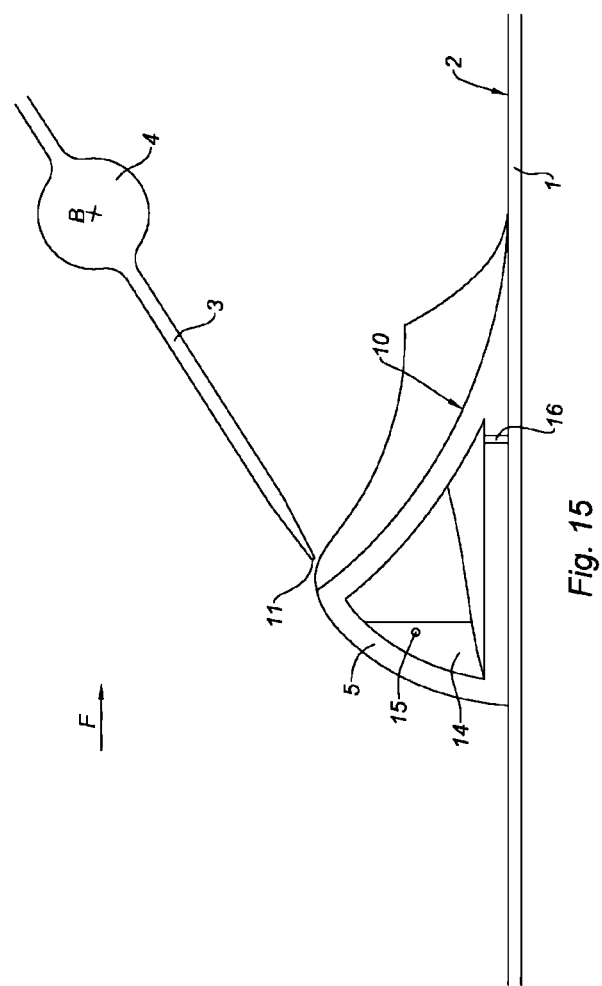
Figure 16:
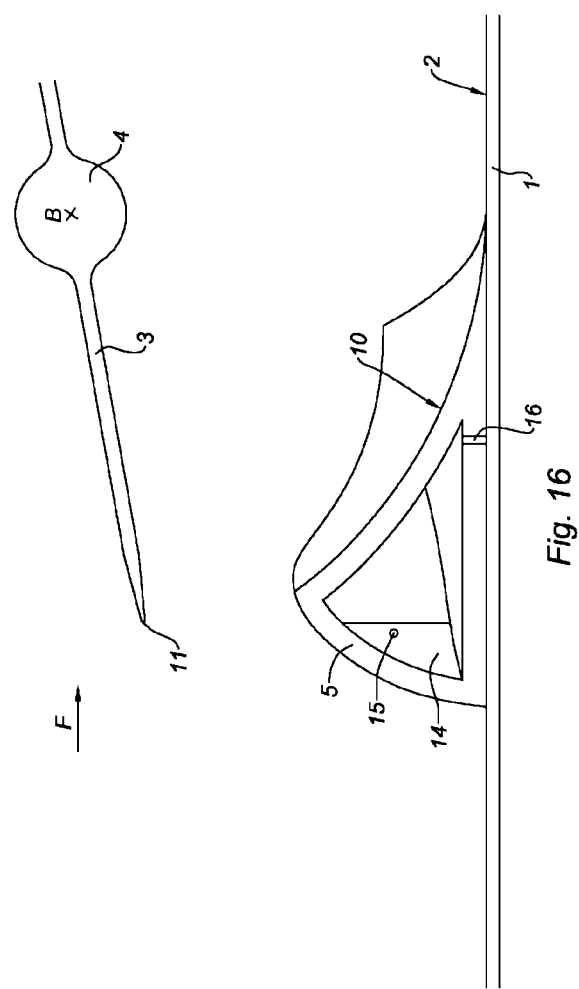
Figure 17:
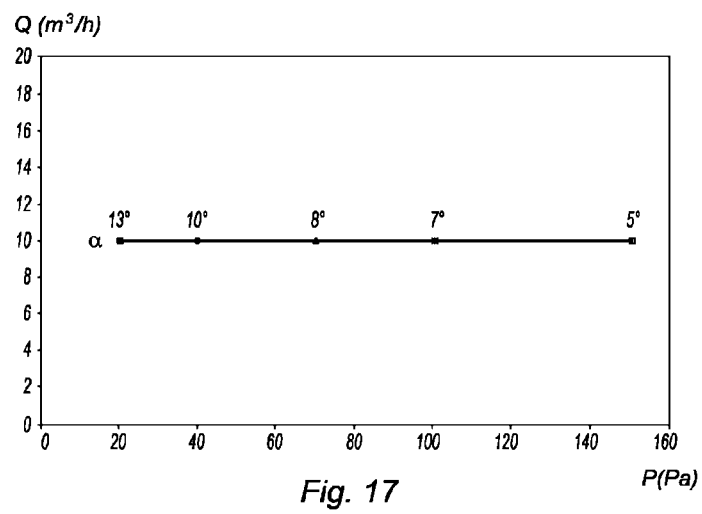
FIG. 17 is a diagram illustrating the degree of opening of a blade of a damper of the prior art according to the pressure in the pipe.

The flap 3 is mobile between a first position in which it extends substantially perpendicularly to the axis A of the pipe 1 and in which the edge 11 of the flap 3 is flush with the inner wall 10 (FIG. 13), and at least one second position in which the edge 11 of the flap 3 is further away from the inner wall 10 (FIGS. 14, 15).

The operation is similar to that previously described. However, in this case, when the flap 3 is pivoted, the edge 11 thereof moves gradually away from the inner wall 10 of the hollow area, so that the air can flow between the edge 11 of the flap 3 and the hollow zone 10. The corresponding passage section increases gradually, as the degree of opening of the flap 3 increases.

The invention is of course not limited solely to the embodiments of this pipe described above as examples, but on the contrary encompasses all alternatives. In particular, the airflow rate regulating device could thus include a single regulating member or first and second regulating members having different shapes, depending on the direction of the airflow.

The invention claimed is:

1. A pipe of circular overall cross section, fitted with an airflow rate regulating device comprising a circular flap with a diameter substantially corresponding to an inner diameter of the pipe, pivotably mounted around an axis substantially perpendicular to an axis of the pipe, and intended to be actuated via a motor, wherein the airflow rate regulating device includes at least one regulating member including an outer wall having a middle zone of cylindrical overall shape bearing against an inner wall of the pipe, on either side of which first and second zones are positioned withdrawn from said inner wall of the pipe, so as to respectively form first and second lateral airflow channels, the regulating member also having an inner wall with a hollow zone designed so that, when the flap pivots, an edge of the flap is flush with or positioned near the corresponding inner wall.

2. The pipe according to claim 1, wherein the airflow rate regulating device includes first and second regulating members arranged opposing one another and generally symmetrically relative to the swivel axis of the flap.

3. The pipe according to claim 1, wherein each regulating member has, in top view, a generally triangular or trapezoidal shape, having a wide end facing the axis of rotation side of the flap and a narrower end, facing the opposite side.

4. The pipe according to claims 1, wherein the inner wall has, in the hollow zone, a shape of a sphere portion whereof a diameter substantially corresponds to the diameter of the flap.

5. The pipe according to claims 1, wherein the inner wall has, in the hollow zone, the shape of a sphere portion whereof a diameter is larger than the diameter of the flap, the flap being mobile between a first position in which it extends substantially perpendicularly to the axis of the pipe and in which the edge of the flap is flush with the inner wall, and at least one second position in which the edge of the flap is further away from the inner wall.

6. The pipe according to claim 1, wherein each regulating member includes a hollow inner space as well as at least one orifice connecting an inside of the pipe to the hollow space.

7. The pipe according to claim 6, wherein each hollow space is fitted with pressure measuring means.

8. The pipe according to claim 1, wherein a motor actuating the pivoting of the flap is housed, at least partially, in the flap, at the axis thereof.

9. The pipe according to claim 7, wherein a position of the flap is calculated according to pressure measurements obtained by the measuring means.

10. The pipe according to claim 1, wherein first and second withdrawn zones of each regulating member are formed by planar zones.

* * * * *